United States Patent
Raterman (10) Patent No.: US 8,951,315 B2
(45) Date of Patent: Feb. 10, 2015

(54) METHOD OF INJECTING FUEL INTO A GASIFIER VIA PRESSURIZATION

(75) Inventor: Michael F. Raterman, Doylestown, PA (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 743 days.

(21) Appl. No.: 12/590,158

(22) Filed: Nov. 3, 2009

(65) Prior Publication Data

US 2010/0115842 A1 May 13, 2010

Related U.S. Application Data

(60) Provisional application No. 61/198,917, filed on Nov. 12, 2008.

(51) Int. Cl.
*C01B 3/36* (2006.01)
*C10J 3/50* (2006.01)
(Continued)

(52) U.S. Cl.
CPC *C10J 3/506* (2013.01); *B01J 8/002* (2013.01); *B01J 8/0035* (2013.01); *B01J 8/062* (2013.01);
(Continued)

(58) Field of Classification Search
CPC ............ B01J 8/003; B01J 3/02; C10J 3/50
USPC .................... 48/62 R–62 A, 197 R–197 A
See application file for complete search history.

(56) References Cited

U.S. PATENT DOCUMENTS 3,447,879 A * 6/1969 Smith et al. .............. 431/4
3,604,758 A 9/1971 Flain et al.
(Continued)

FOREIGN PATENT DOCUMENTS

| EP | 0 066 984 | 7/1984 |
|---|---|---|
| EP | 0 270 013 | 11/1987 |

(Continued)

OTHER PUBLICATIONS

Wenhao Pu; Changsui Zhao; Yuanquan Ziong; Cai Liang; Xiaoping Chen; Peng Lu; Chunlei Fan; "Three-Dimensional Numerical Simulation of Dense Pneumatic Conveying of Pulverized Coal in a Vertical Pipe at High Pressure," Chemical Engineering & Technology, 2008, vol. 31, No. 2, pp. 215-223. Abstract.

(Continued)

*Primary Examiner* — Imran Akram
(74) *Attorney, Agent, or Firm* — Bruce M. Bordelon; Glenn T. Barrett; Chad A. Guice (57) ABSTRACT

The present invention relates to an improved gasifier injection system. In particular, the present invention provides an improved apparatus and operating scheme to improve the control flow of solid particulates in a multi-burner gasifier. The system also provides for integrated flow control and emergency shutoff in the case of abnormal operating conditions or unexpected backflow of the process burners. This improved design simplifies the mechanical systems required for large multi-burner gasifiers thus providing a more reliable and compact gasifier feed system. In preferred embodiments, the gasifier hydrocarbon feed is substantially in a solid particulate state and is preferably comprised of coal, petrochemical coke, and/or solid biomass.

19 Claims, 4 Drawing Sheets

(51) Int. Cl.
   *B01J 8/00* (2006.01)
   *B01J 8/06* (2006.01)
   *C10J 3/72* (2006.01)

(52) U.S. Cl.
   CPC ........ *C10J 3/723* (2013.01); *B01J 2208/00752* (2013.01); *C10J 2200/152* (2013.01); *C10J 2300/0916* (2013.01); *C10J 2300/093* (2013.01); *C10J 2300/0933* (2013.01); *C10J 2300/0936* (2013.01); *C10J 2300/0943* (2013.01); *C10J 2300/1693* (2013.01)
   USPC ..................................................... 48/197 R

(56) References Cited

U.S. PATENT DOCUMENTS

| | | | |
|---|---|---|---|
| 3,733,011 A | | 5/1973 | Driscoll |
| 3,935,825 A | * | 2/1976 | Matthews et al. ......... 110/165 R |
| 4,023,280 A | * | 5/1977 | Schora et al. .................... 34/364 |
| 4,191,500 A | | 3/1980 | Oberg et al. |
| 4,229,289 A | | 10/1980 | Victor |
| 4,257,334 A | | 3/1981 | Mueller |
| 4,270,344 A | * | 6/1981 | Yu .................................. 60/791 |
| 4,338,187 A | | 7/1982 | Gartside et al. |
| 4,441,435 A | | 4/1984 | Miyamoto |
| 4,476,674 A | | 10/1984 | Berman |
| 4,482,275 A | | 11/1984 | Shinozaki et al. |
| 4,521,139 A | | 6/1985 | Kretschmer et al. |
| 4,693,189 A | | 9/1987 | Powers |
| 4,737,269 A | * | 4/1988 | Bischoff ......................... 209/23 |
| 4,758,117 A | | 7/1988 | Maki et al. |
| 4,758,118 A | | 7/1988 | Rachner et al. |
| 4,830,545 A | | 5/1989 | Salter et al. |
| 4,834,588 A | * | 5/1989 | Salter et al. ..................... 406/85 |
| 4,930,356 A | * | 6/1990 | Porges ....................... 73/861.08 |
| 4,941,779 A | | 7/1990 | Dewitz et al. |
| 4,969,930 A | * | 11/1990 | Arpalahti .................... 48/197 R |
| 5,106,240 A | | 4/1992 | Dirkse et al. |
| 5,123,632 A | | 6/1992 | Schmit et al. |
| 5,129,766 A | | 7/1992 | Dirkse et al. |
| 5,469,994 A | | 11/1995 | Reh et al. |
| 5,560,550 A | | 10/1996 | Krawczyk |
| 5,772,937 A | * | 6/1998 | Cohen et al. .................. 264/117 |
| 5,775,852 A | | 7/1998 | Boutte et al. |
| 6,749,373 B2 | | 6/2004 | Von Geldern et al. |
| 7,101,120 B2 | | 9/2006 | Jurkovich |
| 2003/0233788 A1 | * | 12/2003 | Lewis ......................... 48/197 A |
| 2006/0040223 A1 | | 2/2006 | Ghani et al. |
| 2006/0101715 A1 | * | 5/2006 | Vlok et al. ....................... 48/210 |
| 2006/0242907 A1 | | 11/2006 | Sprouse et al. |
| 2008/0086945 A1 | * | 4/2008 | Wunning ...................... 48/86 R |
| 2010/0147413 A1 | * | 6/2010 | Schingnitz et al. ................ 141/4 |

FOREIGN PATENT DOCUMENTS

| | | |
|---|---|---|
| EP | 0308026 B1 | 8/1991 |
| EP | 0335071 B1 | 10/1991 |
| EP | 0497088 A1 | 1/1992 |
| GB | 723047 | 2/1955 |
| GB | 1003358 | 9/1963 |
| GB | 2 145 052 A | 3/1985 |

OTHER PUBLICATIONS

Hashimoto Nozomu; Kurose Ryoichi, Psuji Hirofumi, Shirai Hiromi; "A numerical analysis of pulverized coal combustion in a multiburner furnace," Energy & Fuels, 2007, vol. 21, No. 4, pp. 1950-1958. Abstract.

Du Shan-Wen; Chen Wei-Hsin; Lucas John; "Performances of pulverized coal injection in blowpipe and tuyere at various operational conditions," Energy Conversion and Management, 2007, vol. 48, No. 7, pp. 2069-2076. Abstract.

Chen Wei-Hsin; "A simplified model of predicting coal reaction in a partial oxidation environment," International Communications in Heat and Mass Transfer, 2007, vol. 34, No. 5, pp. 623-629.

\* cited by examiner

METHOD OF INJECTING FUEL INTO A GASIFIER VIA PRESSURIZATION

This application claims the benefit of U.S. Provisional Application No. 61/198,917 filed Nov. 12, 2008.

FIELD OF THE INVENTION

The present invention relates to an improved gasifier feed and oxidant injection system. In particular, the present invention provides an improved apparatus and operating scheme for the control of the flow of solid particulates in a multi-burner gasifier. The system also provides for integrated flow control and emergency shutoff in the case of abnormal operating conditions or unexpected backflow of the process burners. This improved design simplifies the mechanical systems required for large multi-burner gasifiers thus providing a more reliable and compact gasifier feed system. In preferred embodiments, the gasifier hydrocarbon feed is substantially in a solid particulates state and is preferably comprised of coal, petrochemical coke, and/or solid biomass.

BACKGROUND OF THE INVENTION

With increased use and decreasing availability of petroleum supplies, gasification technologies of economical solid hydrocarbon sources such as, but not limited to coal, petrochemical coke, and solid biomass are currently becoming more attractive technically and economically as a versatile and clean way to produce electricity, hydrogen, and other high quality transportation fuels, as well as convert these solids into high-value chemicals to meet specific market needs. Currently there are abundant worldwide supplies of coal as well as a large market supply of petrochemical coke in the U.S. market. The vast majority of these supplies are utilized as fuel in coal-fired electrical plants in the United States or are shipped oversees as low cost fuels for foreign electrical generation.

However, with current gasification technologies, these solid hydrocarbon fuel sources can be used to produce significantly more attractive liquid fuels products, such as gasolines and diesel fuels, through the partial-oxidation of these solid hydrocarbon fuels in a gasifier to produce a syngas product. These solid hydrocarbon feeds, such as coal, petrochemical coke, and/or solid biomass, contain hydrogen and carbon, and can be partially oxidized at elevated temperatures in the presence of an oxidizing gas or vapor, such as air, oxygen, and/or steam to produce a "syngas" product. The chemistry for producing a syngas from hydrocarbon sources is well known in the industry and appropriate feeds and operating conditions can be selected to optimize the chemical reactions in producing the syngas.

The produced syngas is preferably comprised of hydrogen ($H_2$) and carbon monoxide (CO). This syngas can then be converted into valuable liquid transportation fuels, such as gasoline and diesel, through various catalytic reforming processes. The most common and well-known of these processes is the Fisher-Tropsch process which was developed by German researchers in the 1920's. In a Fisher-Tropsch process, the syngas is reformed in the presence of a catalyst, typically comprised of iron and/or cobalt, wherein the syngas is converted into chained hydrocarbon molecules. The following formula illustrates the basic chemical process involved in the Fisher-Tropsch reaction:

$$(2n+1)H_2 + nCO \rightarrow C_nH_{(2n+2)} + nH_2O \qquad [1]$$

In conversion processes for the production of transportation fuels, the conditions are generally optimized to maximize conversion of the reaction products to higher molecular weight hydrocarbon compounds with carbon contents of about 8 to about 20 atoms. As with the syngas production process described above, various chemical processes for the conversion of syngas into liquid hydrocarbon transportation fuels are well known in the art.

Other processes include the conversion of solid hydrocarbon feeds, such as coal, petrochemical coke, and/or solid biomass into syngas (predominantly hydrogen and carbon monoxide) for use as a "clean fuel" in electrical production. The syngas produced by the process retains a relatively high BTU value as compared to the solid hydrocarbon feeds from which it is derived. Especially problematic for clean fuel production can be solid hydrocarbon feeds that are fossil fuel based (such as coal and petroleum coke), as these feeds may contain a significant amount of contaminants such as sulfur and/or nitrogen. These contaminants can be damaging to power generating equipment as well as pose environmental emissions impacts on commercial processes. By first gasifying the solid hydrocarbon fuels, these contaminants can be gasified and more easily removed prior to be using as a gas fuel for power generation. These "clean" fuels can then be used as a combustion fuel for high speed gas turbines or for producing steam for steam driven turbines in the industrial production of electrical power.

The benefit of using these solid hydrocarbon fuel sources is that they are economic fuels relative to liquid or gas hydrocarbon fuels. This is due in part to their low marketability for use as transportation or home heating fuels. This is also due in part to the often significant contaminants (such as sulfur and nitrogen) that are not easily removed from the solid fuel source, often relenting their use to commercial operations which can remove these contaminants as part of the integrated industrial processes.

However, many of the difficulties in using these solid fuels in conventional gasifier systems is in the existence of problems associated with "flowing" a solid fuel into a gasifier system. As gasification technology improves, it is critical that these gasifier systems be increased in size and capacity as well as become more efficient and produce an improved syngas product composition. However, as gasification systems increase in size, usually with a resultant increase in the number of burners per unit, the problems associated with inadequate feed systems and the inability to properly control the solids feed distribution between the multiple burners increase exponentially. These gasification systems operate at very high temperature often in the range of about 2000 to about 5500° F. Even small variations in feed supply rates to the burners can result in off-specification syngas products as well as damage to the equipment due to uneven heating. Uneven supply rates of the solids feed between the associated burners can also result in dangerous backflow conditions. Intermediate feed supplies can also result in isolated over-combustion (or localized explosions) which also can result in significant equipment damage or a shutdown of the gasification processes.

In the prior art, problems associated with solid feed systems were addressed in one manner by the use of "aerating" or "fluidizing" gases to fluidize the solids feed beds. Examples of this technology are illustrated in U.S. Pat. Nos. 4,338,187; 4,830,545; and 5,106,240. The problem with these devices is that a large amount of fluidization gases are used to enable the fluidization of the particulate bed. A significant problem exists in these processes in that the significant amount of fluidizing gas utilized has to be expelled through the burner and reaction chamber of the gasifier. The high volume of these fluidizing gases reduces the available capacity of the gasification unit due to the large amount of fluidization gases traveling through the system. Additionally, since these transport gases typically need to be non-oxidizing gases for safety reasons, these gases cannot be utilized in the reaction process for the production of syngas and thus are basically "contaminants" in the process. This additionally requires that the fluidizing gas contaminant must be removed from the final syngas product before it can be utilized. An additional problem with the use of fluidizing gases is that for proper operation of gasifier system, the fluidizing gas must be heated thus requiring a significant amount of the energy expended in the syngas production process. This energy must be removed from these fluidizing gases at a later stage in the process at considerably lower temperatures. This results in significant overall energy losses in the gasification processes.

Other proposed gasifier feed systems, such as illustrated in U.S. Patent Publication No. 2006/0242907 A1, integrate elaborate feed splitting systems such as the two-stage feed splitting system shown in the patent application. These systems require very elaborate construction and machining as well as are difficult to maintenance. In addition, the allowable voidage of the fuel feed to the system must be kept high in order to allow the feed to evenly flow through the different nozzles and stages, and prevent significant distributor/nozzle plugging. In essence, for these systems to work properly, the feed to the splitters must be effectively "fluidized" in order to prevent significant flow deviation and/or pluggage of the system. The net result is that this system results in the need of a "fluidization" gas to operate properly accompanied with the corresponding drawbacks as described in the systems prior.

What is needed in the industry is a simplified solid hydrocarbon fuels delivery system that does not require the solid fuels to be "fluidized", and simplifies construction of the overall system, while maintaining reliability and improving overall performance and fuel capacity.

SUMMARY OF THE INVENTION

In an embodiment of the present invention is an improved solids fuel delivery system for a gasifier unit. This system can be utilized with low voidage ($\epsilon$) solids feed beds (i.e., preferably below 0.65 voidage) to reliably and accurately deliver solids fuels to multiple burners utilizing a bed delta pressure feed system control. The term "voidage" as used herein is defined as the unit volume fraction of space (i.e., non-solids) between the solid fuel particles.

In a preferred embodiment a minimal amount of acceleration gas is also utilized in each burner tube. In another preferred embodiment of the present invention, a self centering, variable area "iris" valve is utilized to fine tune the flow of solid fuels to the gasification burners. While in a more preferred embodiment, the iris valve is also designed for positive emergency shutoff and integrated into the gasification emergency shutdown controls systems.

A preferred embodiment of the present invention is a method of injecting a solid hydrocarbon fuel into a gasifier unit, comprising:

a) feeding a solid hydrocarbon fuel to a feed chamber of a gasifier unit, thereby creating a dense solids bed of said solid hydrocarbon fuel in said feed chamber; and b) pressurizing a space of said feed chamber above said dense solids bed with a pressurization gas thereby flowing said solid hydrocarbon fuel through an iris valve located between said dense solids bed and a multitude of burner tubes in said gasifier unit, whereby the pressure of said pressurization gas in said feed chamber is varied to control the flow rate of said solid hydrocarbon fuel to the entrance of said multitude of burner tubes.

In a more preferred embodiment of the present invention as described above, the dense solids bed has a voidage of less than 0.65. In another more preferred embodiment, the solid hydrocarbon fuel is comprised of a hydrocarbon-containing material selected from coal, petrochemical coke, and solid biomass.

In another more preferred embodiment, the method describe above, further comprises:

injecting an acceleration fluid into said burner tubes whereby a decrease in pressure is obtained at the entrance of said multitude of burner tubes as a result of the increase in flow velocity in said burner tubes.

More preferably, the acceleration fluid is comprised of air, oxygen, carbon dioxide, steam, or nitrogen.

Another embodiment of the present invention is an apparatus for converting a solid hydrocarbon fuel and an oxidizing gas into a syngas comprised of molecular hydrogen and carbon monoxide, comprising:

a means for controllably supplying said solids hydrocarbon fuel to a feed chamber;

a means for controlling the level of a dense solid bed of said solid hydrocarbon fuel in said feed chamber wherein said means for controlling the level of said dense solid bed is comprised of a level indicator connected to said feed chamber and a level control valve that is fluidly connected to said feed chamber;

a means for controlling the pressure of a pressurization gas in said feed chamber wherein said means for controlling the pressure of the pressurization gas is comprised of a differential pressure indicator connected to said feed chamber at a point above the top of said dense solids bed and connected to said feed chamber at a point below the top of said dense solids bed, and a pressurization gas control valve that is fluidly connected to said feed chamber; and an iris valve that is in fluid contact with said dense solids bed on one side of said iris valve and in fluid contact with the entrance to a multitude of burner tubes on the opposite side of said iris valve.

DETAILED DESCRIPTION OF THE INVENTION

As described in the background section of this application, prior art gasifier solids fuel feed systems have focused on "fluidizing" the solids bed in order to improve the flow properties of the solids fuel to the gasification burners. While this can result in improving the flow properties of the solids, generally by increasing the voidage of the fuel system to above about 0.65 and thus resulting in a "fluidized solid", the resulting large amount of contaminant fluidization gases utilized in the processes have very significant process chemistry, energy consumption, and equipment sizing drawbacks as previously discussed. Additionally, as these gasifier unit increase in size and efficiency, the need for systems with an increased number of individual burners is required to maintain the overall efficiency of the process. As a result, improved systems for uniform solid hydrocarbons feed delivery are integral to improving the overall process. The equivalent terms "solid hydrocarbon feed" or "solid hydrocarbon fuel", as utilized herein, refer to any hydrocarbon-containing feed that is a substantially a solid at atmospheric pressure and temperature condition. It should also be noted that that the "solid hydrocarbon feeds" or "solid hydrocarbon fuels", as described herein, are particulate in composition, preferably with an average Sauter mean diameter particulate of from about 32 microns to about 16 microns, more preferably with an average Sauter mean diameter particulate of from about 28 microns to about 20 microns.

Figure 1:
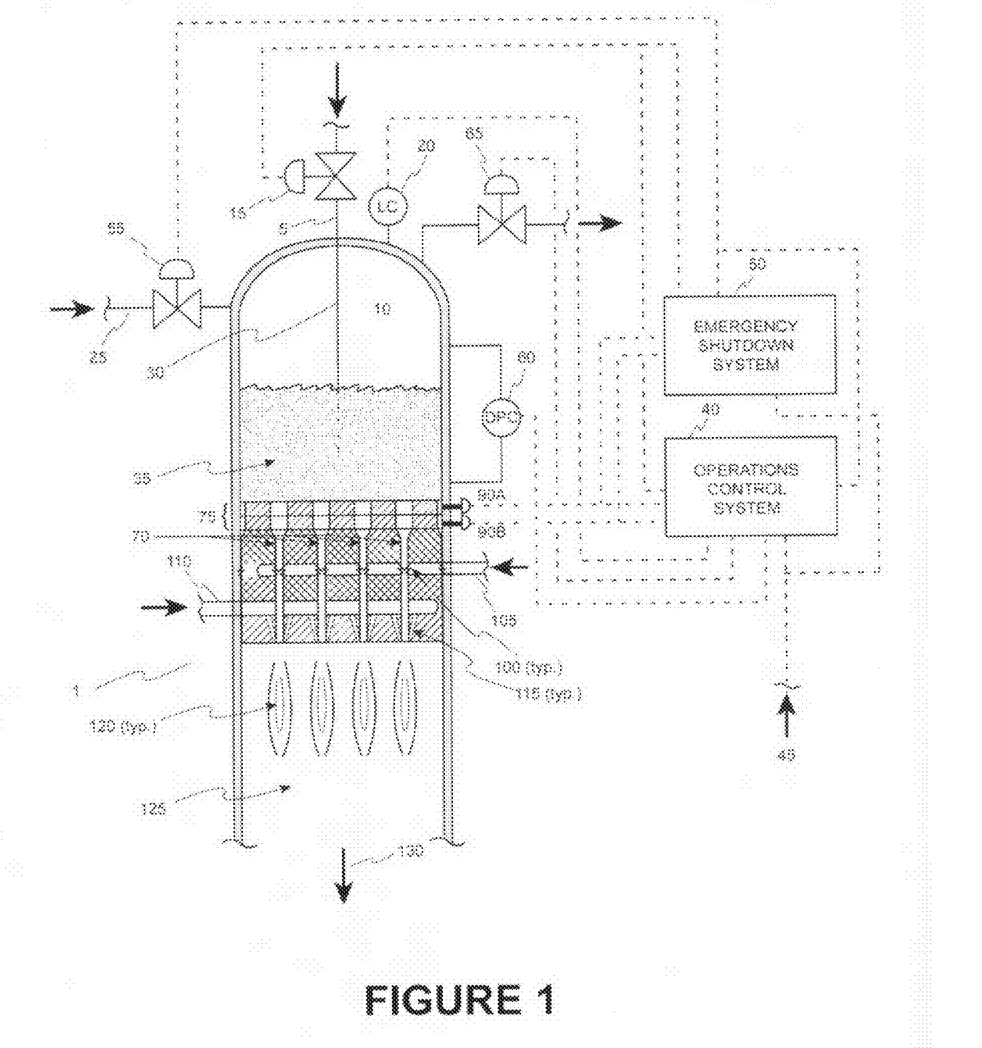
FIG. 1 is an elevated cross-section illustration of a gasifier unit incorporating the components of the present invention.

The overall simplified gasifier feed system of the present invention is illustrated in FIG. 1. Here, the gasifier unit (1) has a solids feed line (or similar solid distribution device) (5) for delivering the solids hydrocarbon fuel to the feed chamber (10). For simplicity, only a single solids feed line is shown although multiple solids feed lines (or similar solid distribution devices) may be integrated into the overall unit. Multiple feed lines (or similar solid distribution devices) may be used to control the distribution of the materials in the bed to help provide uniform flow or may have different solids fuel feed compositions for adjusting the overall solids feed composition in the feed chamber (10). Preferably, a solids feed control valve (15) is located on the solids feed line and is preferentially operated via a signal from a level controller (20) located on the feed chamber (10), and preferably, the signal from the level controller (20) is first routed through an Operations Control System ("OCS") (40). In a preferred embodiment, the solids feed control valve (15) receives a signal from an integrated Emergency Shutdown System ("ESS") (50) to close the solids feed control valve (15) in the event of an emergency situation. In an embodiment, the solids feed line (5) is extended into a dipleg (30) within the feed chamber (10) terminating below the upper level of the solids feed bed (35). In a preferred embodiment (not shown), the solids feed line (5) is extended into a dipleg (30) within the feed chamber (10) terminating above the upper level of the solids feed bed (35), but below the pressurization gas (25) inlet. In other preferred embodiments, the level controller (20) utilizes a signal selected from radar waves, ultrasonic waves, and laser beams to detect the level of the solids feed bed (35) in the gasifier feed chamber (10). The control wiring between the controls systems and the controllers is shown as dashed lines in FIG. 1 for the present invention.

The term "Operations Control System (or "OCS")", as utilized herein, is defined as an integrated control system which receives status signals from multiple indicator devices, manipulates the information from the status signals, and provides control signals to multiple control devices in order to control the normal operation of the gasification unit. The Operations Control System can be comprised of such devices as, but not limited to, distributive control systems and programmable logic controllers. The term "Emergency Shutdown System (or "ESS")", as utilized herein, is defined as an integrated control system which receives status signals from multiple indicator devices, manipulates the information from the status signals, and provides control signals to multiple control devices to either put emergency shutdown devices and/or controllers to either a safe mode or to a system shutdown mode in the event of a signal from a device indicating and abnormal or emergency situation. The Emergency Shutdown System can be comprised of such devices as, but not limited to, distributive control systems and programmable logic controllers. The Emergency Shutdown System can be either an integrated sub-system of Operations Control System or can be a standalone system from the Operations Control System. For safety purposes, the latter is preferred.

A pressurization gas (25) is fed into the upper portion the feed chamber (10). The pressurization gas (25) to the feed chamber (10) is preferably controlled by a remote Operations Control System ("OCS") (40), based on multiple inputs (45) from the overall gasification process including product composition and production rates, which in turn sends the proper control input to the pressurization gas control valve (55). In the present invention, the solids feed system primarily utilizes control of the pressure of the pressurization gas in the feed chamber (10) to control the overall solids feed rates through the burners. Here, unlike the fluidized beds of the prior art, a dense solids bed (35) system is utilized, with a corresponding bed voidage (c) of less about 0.65. In more preferred embodiments, the voidage of the dense solids bed (35) is less than about 0.55, and even more preferably the voidage of the dense solids bed (35) is less than about 0.45. These multiple inputs (45) can also be sent to the Emergency Shutdown System ("ESS") (50) in order to indicate an abnormal or emergency situation thereby signaling the Emergency Shutdown System to initiate necessary controls to put the gasifier unit into either a safe mode or shutdown position.

Continuing with FIG. 1, the solids bed of the present invention is not fluidized, but the solids move in a "plug flow" manner. This plug flow allows very little of the pressurization gas (10) to infuse through the bed and into the burner systems, resulting in a significant reduction in overall contaminants into the reaction products as compared to the prior art. Preferably, a solid bed differential pressure controller (60) is supplied which monitors the differential pressure from near the bottom of the solids bed to the portion of the feed chamber (10) above the top of the solids bed. The signal from this solid bed differential pressure controller (60) is preferably fed into the OCS system (40) which provides an output signal to a depressurization control valve (65) in order to decrease the pressure in the feed chamber (10) by releasing a portion of the pressurization gas in the feed chamber (10), thereby controlling the solids feed flow rate to the burner tubes of the gasifier unit.

Figure 2:
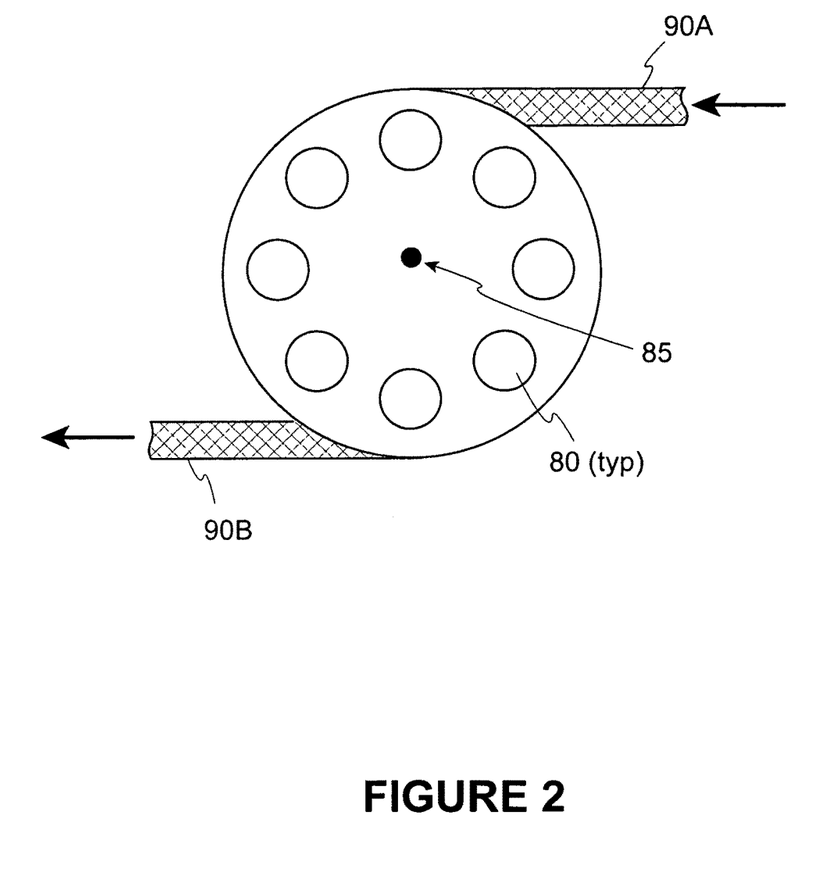
FIG. 2 is a plan view of one embodiment of an "iris valve" as utilized in the present invention wherein the iris valve is in the fully open position.
Figure 3:
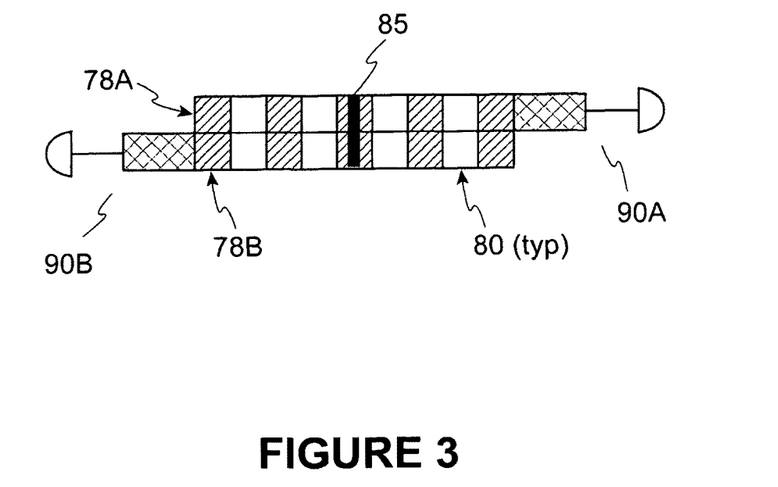
FIG. 3 is an elevation cross-section view of the "iris valve" shown in FIG. 2.

In a preferred embodiment of the present invention, the solids feed is delivered from the solids feed bed (35) to the individual burners tubes (70) through an "iris" valve (75). The iris valve is comprised of two contacting machined plates (78A) and (78B) (see FIG. 3) which have concentric holes that are aligned concentrically with the individual burner tubes (70). When the iris valve is controlled, these plates rotate in opposite directions relative to one another so that the ports (80) (see FIGS. 2 and 3) through two plates remains substantially centered with the burner tubes as the iris valve moves between the open and shut positions. FIG. 2 illustrates a plan view of an iris valve (75) as utilized in the present invention wherein the iris valve is in the fully open position. The iris valve has a centered shaft or pivot (85) and the opposing contacting machined plates (78A) and (78B) are shown in FIG. 3 can be operated by linear actuators (90A) and (90B). However, other valve operators known in the art, such as (rotary shaft drives or rack and pinion drives) may be utilized to operate the iris valve.

FIG. 3 is an elevation cross-sectional view of the iris valve of FIG. 2. In FIG. 3, a cut-away view through the iris valve's machined plates (78A) and (78B) can be seen. Also shown are the linear actuators (90A) and (90B) utilized to rotate each of the plates. As can be seen in this figure, the actuators (90A) and (90B) are attached to each of the upper and lower plates, respectively, of the iris valve. Here can also be seen centered shaft or pivot (85) for the rotary iris valve as well as the valve ports (80) shown in the position of a fully opened iris valve. Again, it is important that both the upper and lower plate move counter rotational to each other (as compared to keeping one plate fixed and rotating only one plate) in order to keep the flow of the solids feed substantially concentric to the flow tubes (70). In FIGS. 2 and 3 it can be seen that the ports (80) of the iris valve are preferably circular in cross-section. However, it should be obvious that other cross-sectional shapes may be utilized for the ports in order to modify the flow characteristics through the iris valve.

Figure 4:
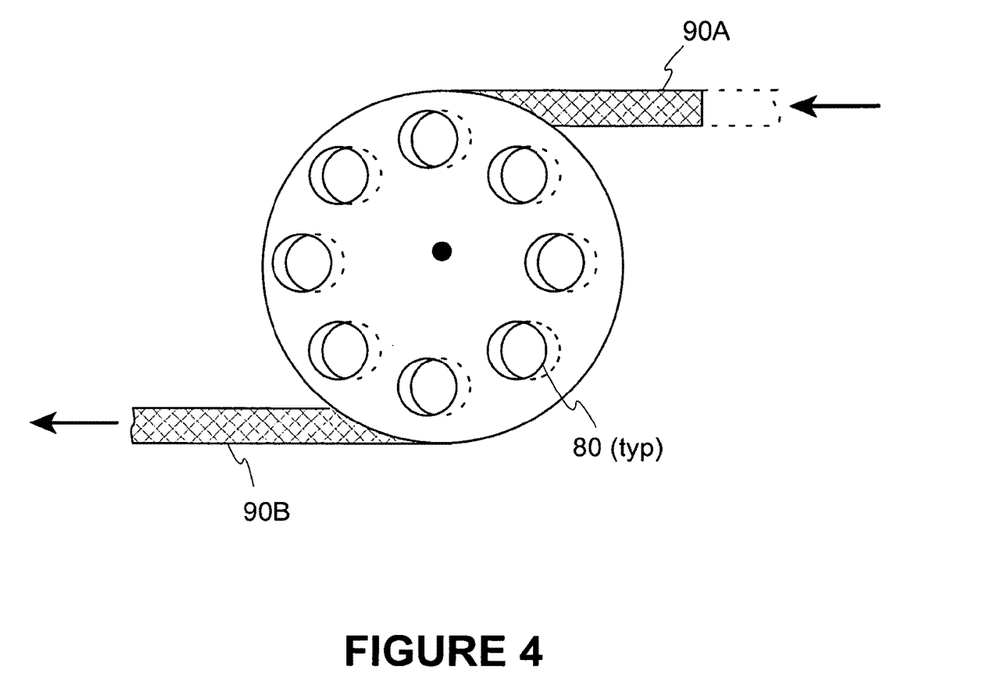
FIG. 4 is a plan view of the "iris valve" shown in FIG. 2 wherein the iris valve is in the partially closed position.

FIG. 4 shows a plan view of the iris valve (75) similar to that of FIG. 2; however, FIG. 4 illustrates shows the iris valve in the partially closed position. As can be seen in FIG. 4, a valve port opening (80) is maintained wherein the clear open space is reduced. However, it should again be reiterated that although not clearly illustrated in FIG. 4, both of the iris valve's machined plates (78A) and (78B) move counter-rotational to one another so as to maintain the valve port opening (80) shown in FIG. 4 substantially centered with the entrances to the individual gasifier burners tubes (70).

There are additional benefits associated with using the iris valve configuration of the present invention. One benefit is that the iris valve allows for the control of the solids flow rates through the burners by adjusting the open cross-section area of the valve. This feature allows for the uniform turndown of the gasifier burner capacity without affecting the density of the solid fuel feed. In a preferred embodiment, the actuators (90A) and (90B) are integrated with, and receive position signals from, the Operations Control System (40) for advanced automated control.

A second benefit, as mentioned above, is that the iris valve in the present invention is designed wherein the opposing rotation of the valve plates maintains the port opening substantially centered with the burner tubes. This is important in high temperature gasification so that the fuel supply travels in a controlled pattern through the burner tubes maximizing mixing and combustion efficiencies. A third benefit is that the valve is "self cleaning" of the solids fuel deposits and if there is solids buildup next to the valve port, the valve can be stroked or "bumped" to help dislodge any temporary solids buildup or bridging. Fourthly, in a preferred embodiment, the iris valve (75) is a fire-resistant, emergency shutoff valve. In this embodiment, in the case of an emergency situation, the valve actuators receive a signal from the Emergency Shutdown System (50) to move the iris valve to the closed position, thereby eliminating blowback of combustible materials into the feed chamber (10) which could result in catastrophic failure to the gasifier system and/or injury to operating personnel.

Continuing with the gasifier embodiment in FIG. 1, the solids feed passes through the ports of the iris valve (75) and into the burner tubes (70). In a preferred embodiment of the present invention, acceleration gas ports (100) are incorporated into the burner tubes (70). These acceleration gas ports are fed the acceleration gas via an acceleration gas header (105). The acceleration gas ports are preferably angled to inject the acceleration gas in the same flow direction down the burner tubes as the solids flow in the burner tubes. This acceleration gas creates a pressure drop between the entrance to the burner tube and the point in the burner tube wherein the acceleration gas is injected by increasing the overall velocity in the burner tubes (70). This can be used to improve the solids feed flow characteristics near the entrance of the flow tubes thus improving the overall reliability and flow precision achieved in the gasifier feed operations by the present invention. It should be noted that here, that the solids feed bed (35) is not fluidized as in the prior art, and therefore a significantly lower amount of gas can be used as an acceleration gas in the present invention than as a fluidizing gas in the prior art.

An additional benefit to using an acceleration gas in the burner tubes is that while a non-oxidizing gas may be utilized as the acceleration gas, the injection point of the acceleration gas in this embodiment of the present invention is below the iris valve which can be operated as an emergency shutoff. Therefore, the acceleration gas may be comprised partially or even wholly of an oxygen-containing material so long as the amount of oxygen in the acceleration gas provided does not support combustion within the burner tubes (70). One such preferred acceleration gas that may be utilized in the present invention is steam. The benefit of utilizing steam is that it can be injected in a manner which does not allow the solids hydrocarbon fuel/steam mixture to support combustion in the burner tubes. Another benefit is that the steam can provide additional heat for the gasification reaction. Thirdly and most importantly, steam does not introduce any "contaminant" materials into the syngas process as both hydrogen and oxygen are essential components of the syngas products. Therefore, in a preferred embodiment herein, the acceleration gas is comprised of air, oxygen, carbon dioxide, or steam. In a more preferred embodiment, the acceleration gas is comprised of steam. In another more preferred embodiment the acceleration gas is comprised of air or oxygen, wherein the oxygen to hydrocarbon ratio in the burner tube is below the amount necessary to support combustion. It should also noted that inert gases, such as nitrogen, can be utilized as an acceleration gas although these gases may not have the same compositional benefits in the gasification reaction as described above for the oxygen-containing acceleration gases.

Continuing with FIG. 1, an oxidizing gas is fed into an oxidant feed header (110). The oxidant feed header distributes the oxidizing gas via the oxidant feed nozzles (115) to the tips of the burner tubes (70) where the oxidizing gas and solids feed material are combusted thereby generating a flame front (120) in the gasification chamber (125). In the gasification chamber (125) the solids hydrocarbon fuels and the oxidizing gas are converted into a syngas product (130) comprised of hydrogen ($H_2$) and carbon monoxide (CO). It should be noted that at least two oxidant feed nozzles (115) should be utilized around the perimeter of the tip each burner tube (70) and oriented evenly about the perimeter in such as manner as to keep the flame front from each burner substantially centered and confined in order to maximize the reaction conversion efficiency. As such, instead of utilizing individual oxidant feed nozzles (115), a nozzle "ring" may be formed around the tips of the burner tubes (70) through which an essentially 360° ring of acceleration gas can flow around the tip of each burner tube (70) in order to provide an optimized flame front pattern in the gasification chamber (125).

In a preferred embodiment of the present invention, at least a portion of the syngas product (130) is further utilized to produce liquid transportation fuels. In a preferred embodiment, the liquid transportation fuels are comprised of gasolines and diesel fuels. Gasolines are defined herein as hydrocarbon fuels wherein at least 90 vol % of the hydrocarbon fuel boils between 80 and 450° F. at atmospheric pressure. Diesels are defined herein as hydrocarbon fuels wherein at least 90 vol % of the hydrocarbon fuel boils between 350 and 600° F. at atmospheric pressure.

In another preferred embodiment of the present invention, the syngas product (130) produced by the present invention is utilized as a fuel to a gas turbine. In another more preferred embodiment, the gas turbine is utilized to produce electricity.

In another preferred embodiment of the present invention, the syngas product (130) produced by the present invention is utilized as a burner fuel to produce high pressure steam. High pressure steam is defined herein as steam at a pressure of at least 500 psig. In a preferred embodiment, the steam is superheated. In another more preferred embodiment, the steam is utilized to drive a steam turbine to produce electricity.

Although the present invention has been described in terms of specific embodiments, it is not so limited. Suitable alterations and modifications for operation under specific conditions will be apparent to those skilled in the art. It is therefore intended that the following claims be interpreted as covering all such alterations and modifications as fall within the true spirit and scope of the invention.

What is claimed is:

1. A method of injecting a solid hydrocarbon fuel into a gasifier unit comprising:
    a) feeding a solid particulate hydrocarbon fuel to a feed chamber that is superimposed above a gasification chamber of the gasifier unit, thereby creating a non-fluidized dense solids bed of said solid particulate hydrocarbon fuel having a voidage [$\epsilon$] of less than 0.65 in said feed chamber;
    b) pressurizing a space of said feed chamber above said dense solids bed with a pressurization gas thereby flowing said solid hydrocarbon fuel through an iris valve located between the feed chamber and a plurality of burner tubes in the top of the gasification chamber of said gasifier unit, and
    c) injecting an acceleration gas into said burner tubes from an acceleration gas port in the flow direction of the solid hydrocarbon fuel whereby a decrease in pressure is obtained at the entrance of said burner tubes as a result of the increase in flow velocity in said burner tubes, and
    d) controlling the flow rate of said solid hydrocarbon fuel to the entrance of said multitude of burner tubes by varying the pressure of said pressurization gas in said feed chamber; and
    e) converting the solid hydrocarbon fuel into a syngas.

2. The method of claim 1, wherein the pressure of said pressurization gas in said feed chamber is controlled by means of an input from an Operations Control System to a pressurization gas control valve located on a supply line for said pressurization gas to said feed chamber, as a response for an increase or decrease in the flow rate of said solid hydrocarbon fuel.

3. The method of claim 2, wherein said Operations Control System transmits a signal to said pressurization gas control valve in response to a change in the production rate of syngas produced by the gasification unit.

4. The method of claim 1, wherein said iris valve is utilized to control the flow rate of said solid hydrocarbon fuel to the entrance of said multitude of burner tubes.

5. The method of claim 1, wherein the iris valve is comprised of two machined plates that both rotate counter-rotationally relative to each other.

6. The method of claim 5, wherein rotational position of the plates of said iris valve are controlled by means of an input from an Operations Control System to at least one actuator in mechanical contact with said iris valve, as a response for an increase or decrease in the flow rate of said solid hydrocarbon fuel.

7. The method of claim 5, wherein said iris valve is an emergency isolation which is moved to the closed position in response to a signal from an Emergency Shutdown System.

8. The method of claim 1, wherein said acceleration fluid is comprised of air, oxygen, carbon dioxide, steam, or nitrogen.

9. The method of claim 1, wherein said acceleration fluid is comprised of steam.

10. The method of claim 1, wherein said acceleration fluid is comprised of oxygen, wherein the oxygen to hydrocarbon ratio in the burner tube is below the amount necessary to support combustion within the burner tubes.

11. The method of claim 1, further comprising: injecting an oxidizing gas near the exit of said burner tubes wherein said solid hydrocarbon fuel and oxidizing gas are combusted at a temperature of about 2000 to about 5500° F., thereby producing a syngas product comprised of molecular hydrogen and carbon monoxide.

12. The method of claim 11, wherein at least a portion of said syngas product is further combusted in a gas turbine.

13. The method of claim 11, wherein at least a portion of said syngas product is further combusted in a boiler to produce steam.

14. The method of claim 13, wherein at least a portion of said steam is utilized to drive a steam turbine.

15. The method of claim 11, wherein at least a portion of said syngas product is further reformed in the presence of a catalyst into liquid hydrocarbon fuel compounds with carbon contents of from about 8 to about 20 atoms.

16. The method of claim 1, wherein said solid particulate hydrocarbon fuel is comprised of coal, petrochemical coke, and solid biomass.

17. The method of claim 1 in which the non-fluidized dense solids bed in the feed chamber has a voidage [$\epsilon$] of less than 0.55.

18. The method of claim 1 in which the non-fluidized dense solids bed in the feed chamber has a voidage [$\epsilon$] of less than 0.45.

19. The method of claim 1 in which an oxidizing gas is fed to the burner tubes after the acceleration fluid to generate a flame in the gasification chamber following the burner tubes.

* * * * *